Feb. 19, 1952          G. F. DALES          2,586,309

DOUBLE ARM THERMOSTAT

Filed Jan. 13, 1950

INVENTOR.

George Franklin Dales

BY

Oldham & Oldham

ATTORNEYS

Patented Feb. 19, 1952

2,586,309

UNITED STATES PATENT OFFICE 2,586,309

DOUBLE ARM THERMOSTAT

George Franklin Dales, Akron, Ohio, assignor of forty-nine per cent to Alton R. Wells, Akron, Ohio Application January 13, 1950, Serial No. 138,381

3 Claims. (Cl. 200—138)

This invention relates to thermostats, and, more particularly, is concerned with thermostats having a pair of bi-metal arms or strips, each strip carrying a contact point adapted to engage at normal or selected temperatures with the other contact point, both bi-metal strips moving to effect the breaking of the contact points upon appropriate temperature change.

Heretofore, a wide variety of thermostats have been provided and adapted to perform a plurality of operations. The large majority of these thermostats are relatively bulky in size and, accordingly, are difficult if not impossible to use in relations or structures necessitating a relatively small dimensioned thermostat. Again, many of the known thermostat structures are relatively complicated in structure and expensive to manufacture. Or known thermostats include the case as part of the circuit, which is often objectionable. Still again, the calibration of many of the existing thermostats is relatively complicated, often necessitating adjusting screws which require careful setting, and with the thermostats often requiring resetting, especially after installation. Furthermore, I have found that known thermostats are often subject to loss of calibration or unsatisfactory operation when the thermostat is subjected to vibration or accentuated gravity or centrifugal forces in use. The use of long contact carrying bi-metal or other arms makes a thermostat have a longer life without loss of calibration, but such long arms are very subject to vibration and forces as just described.

It is the general object of my invention to avoid and overcome the foregoing and other difficulties of and objections to known thermostat structures by the provision of an improved thermostat characterized by compactness and smallness of size, inexpensiveness of manufacture, ruggedness and permanency of calibration before and after installation, and lack of sensitivity to vibration, gravity and centrifugal forces.

Another object of my invention is to provide a relatively small thermostat in which grounding or shorting of the bi-metal strips and contact points with the casing is substantially eliminated and uniformity of movement of a plurality of bi-metal arms or strips is coordinated and combined to effect an opening or closing of the thermostat contacts.

Another object of my invention is the provision of a thermostat utilizing a pair of bi-metal strips and in which accurate calibration is effected by controlled parallel positioning action of opposite ends of the thermostat casing, a bi-metal strip being supported from each end of the casing.

Another object of my invention is to provide a thermostat characterized by small size, positiveness of operation, inexpensiveness of manufacture and calibration, and by long life.

Another object of my invention is to provide a thermostat in which the bi-metal strips are exposed outside the ends of the casing to render the thermostat more rapid in response to temperature change.

Another object of my invention is the provision of a thermostat having the long life and permanency of calibration of a long contact arm thermostat plus the high frequency reaction and lack of sensitiveness to vibration and centrifugal and gravity pulls of a short contact arm thermostat.

The foregoing objects of my invention, and other objects which will become apparent as the description proceeds, are achieved by the provision of a thermostat including a casing, a pair of bi-metal arms or strips, one strip extending into each end of the casing, mating contact points on adjacent strip ends, said contact points being adapted to contact each other with the thermostat at normal temperature, insulation around each strip adjacent the casing ends, the ends of the casing being flattened and compacted around the insulation and strips. The flattening and compacting of the casing is usually concentrated in transversely extending, opposite stake-like areas, the ends of the strips being held in parallel relation to each other, the spacing between the parallel relation ends determining the tension on the bi-metal strips and the temperature at which the contact points of the strips will open. An equal angle is provided between each flattened and compacted end of the casing and the center line of the unflattened portion of the casing. The casing preferably takes the form of a tube having an oval shape in cross section, and one contact point is usually formed flat while the other contact point is rounded.

For a better understanding of my invention, reference should be had to the accompanying drawings wherein Fig. 1 is a plan view, partially broken away, and on enlarged scale, illustrating one embodiment of the principles of my invention;

Figure 1:
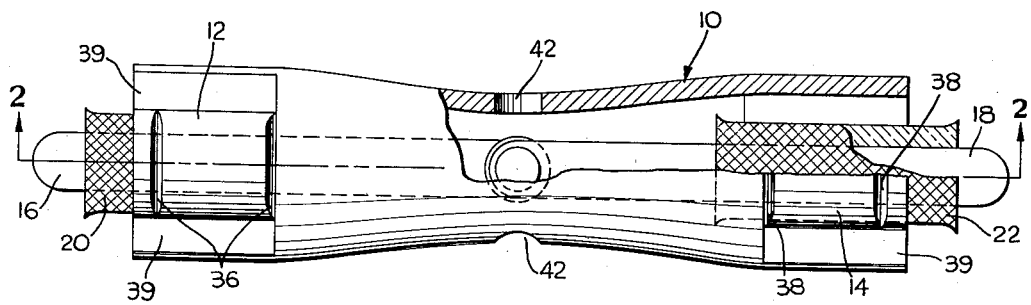

Having more detailed reference to the drawings, the numeral 10 indicates generally a casing, preferably formed of metal, for example aluminum or brass, the casing having substantially an oval shape in cross section, and with the ends of the casing being flattened and compacted, as at 12 and 14. The term casing, as employed in the specification and claims, is intended to include, unless otherwise specifically limited by descriptive language, any frame, member, or other holding means whether or not tubular. The flattened and compacted ends of the casing 10 engage with the ends of a pair of bi-metal arms or strips 16 and 18, a suitable insulation sleeve or wrap 20 and 22 surrounding each strip end 16 and 18 between the strip end and casing to effectively insulate the bi-metal strips from the casing. The insulation 20 and 22 may comprise silicon-impregnated glass fabric, this having been found to be particularly effective, although other satisfactory insulating means may be employed.

Figure 2:
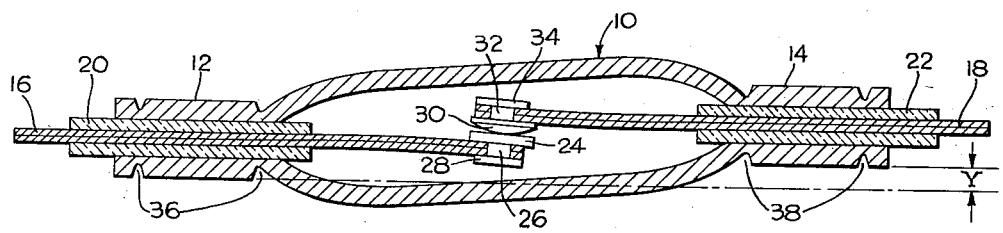
Fig. 2 is a longitudinal vertical cross-sectional view taken substantially on line 2—2 of Fig. 1.

The bi-metal strip 16 has a flat-surfaced contact 24 mounted in its end at the center of the casing, the contact 24 being suitably secured to the bi-metal strip as by having a post portion 26 extending through a hole in the end of the bi-metal strip, the post being flattened into a head 28 to lock the contact in place. Similarly, the bi-metal strip 18 has a contact 30 carried at its end adjacent the contact 24, the contact 30 having a rounded head, as best seen in Fig. 2, so that a point contact will exist between the contacts 24 and 30 regardless of the exact angular relation between the bi-metal strips. The contact 30 is held in position on the end of the bi-metal strip 18 in any desired manner, for example by forming the contact 30 with a post 32 which extends through a hole in the end of the bi-metal strip, the post 32 being formed into a rivet head 34.

The flattened and compacted areas 12 and 14 of the casing 10 also include transversely-extending stakes 36 and 38 on the top and bottom of the casing, these stake-lines effecting a concentration of the compacting pressures and insuring a spaced-apart, anvil-like gripping of each bi-metal strip to give a very rigid cantilever support to the bi-metal strip, and to effect an excellent sealing action between the casing and the bi-metal strip when the thermostat is to comprise a sealed unit. It will be understood that if the casing 10 is tubular and has no openings in it and the ends of the casing are sealed around the bi-metal strips, the thermostat will be sealed. On the other hand, it is entirely possible to form the casing 10 with holes 42, for example, at diametrically opposed portions near the center thereof to facilitate the unsealed or open operation of the thermostat in certain installations. Whether or not the holes 42 are utilized in the casing 10, I have found that the very considerable compacting between the casing ends and the bi-metal strips, all in the manner described, causes a transfer of heat from the casing 10 to the bi-metal strips in use to make the bi-metal, and thus the thermostat, more responsive to the temperature change, and quicker and more positive acting. Also, it is to be noted, as best seen in Figures 1 and 2 of the drawings, the ends of the bi-metal strips are exposed at the ends of the casing, and I have found that these exposed ends pick up and conduct heat into the bi-metal strips to render the thermostat of the invention more rapid in operation and more responsive to temperature change.

Figure 3:
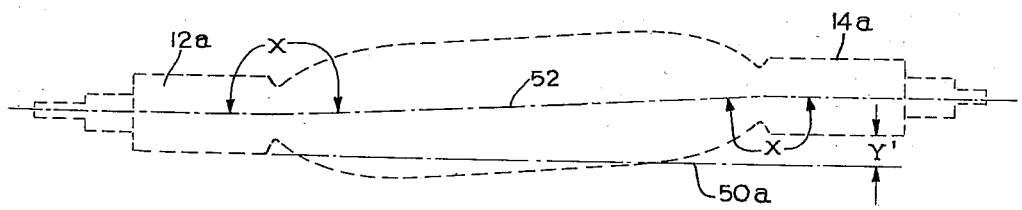
Fig. 3 is a view similar to Fig. 2 but diagrammatically illustrates the thermostat after calibration.

Turning now to Figures 2 and 3, I have made clear the manner of calibrating the thermostat. This is achieved, in general, as shown in Fig. 2 by die forming the ends 12 and 14, usually by the same dies as effect the flattening and compacting or staking of the ends, so that the ends are in parallel relation. This parallel relation is indicated by a dotted line 50 in Fig. 2 which forms a continuation of the bottom of end 12, the line 50 being parallel to and spaced a distance Y from the bottom of end 14.

It will be evident that the larger the distance Y is, the less is the tension on the bi-metal strips and the lower is the temperature at which the thermostat contacts will open. By way of example, I have found that when Y is .060", the contacts will open at 175° F. When Y is .040", the contacts will open at 250° F. It is possible to reduce the dimension Y to zero or to a minus quantity (within the elastic limits of the bi-metal strips, of course) to effect operating temperatures desired, all while maintaining the parallel relationship stressed.

Having reference to Fig. 3, I have illustrated geometrically the parallel relationship described. In this figure, the line 50a from the bottom of end 12a is spaced a distance Y' from the bottom of end 14a of the casing. Also, this Fig. 3 shows that end 14a makes an angle X with the center line 52 of the casing 10, and the end 12a makes the same but an opposite angle X with the center line 52 of the casing 10. It will be seen that making the angles X greater and up to or past 180° increases the spring tension on the bi-metal strips and the stress with which the contact points are held together. This increases the temperature necessary to open the contacts.

Maintaining the angles X at opposite ends of the casing equal is important so that each bi-metal strip and its associated contact point is positioned equidistant from the inside of the casing 10. Also, it might be noted that the bi-metal strips are aligned with each other and spaced equally from the sides of the casing by forming lengthwise-directed flat lands 39 on each casing end 12 and 14 at each side of the bi-metal strips.

It is a relatively simple matter to position the dies engaging with the ends 12 and 14 of the casing so that they are in aligned parallel offset relation to each other a distance of Y to effect the desired calibrating of the thermostat. Sometimes I am able to combine the assembly of the bi-metal strips 16 and 18 and the flattening of the casing ends 12 and 14 with the calibrating action described, but more usually, the thermostat is assembled, tested and finally calibrated.

From the foregoing, it will be recognized that the various objects of my invention have been achieved by the provision of a relatively simple, inexpensive, but rugged and long-lived thermostat incorporating a pair of bi-metal strips, the compound movement of which in opposite direction effects the breaking of the contact points. The casing of the thermostat is dead, that is, it forms no part of the electric circuit, the electric circuit, it being understood, passing solely through the bi-metal arms or strips. The thermostat can be sealed or not, as desired. In fact, the holes 42 facilitate the introduction and sealing of inert gas in the casing of the thermostat, if desired, to better adapt the thermostat to heavy D. C. or low temperature operations. Vibration or other forces have very little effect on the thermostat, both points tending to vibrate if at all in a very short arc, i. e., at a high frequency and on a parallel line without interfering with the normal action and operation of the thermostat. The conduction of heat through the bi-metal strips themselves on both ends of the casing is relatively high, and there is plenty of movement per degree of temperature change in the compound action of the bi-metal strips. Moreover, it is possible to clamp on the center portion of the casing of the thermostat to support or carry the thermostat all without effecting the operation or calibration of the thermostat. Holding a thermostat positively in position in use often presents a problem, and with my improved thermostat, this is facilitated and heat transfer is enhanced, all as just noted. Also, the fact that the center of the casing 10, as visible in Fig. 1, is smaller than the ends prevents the thermostat from slipping out from under a clamp. Calibration is rapid and accurate. I have found that I am able to readily calibrate to within plus or minus two degrees Fahrenheit. The casing of the thermostat is relatively short and the thermostat can be built in comparatively small sizes, rendering it convenient for many purposes where thermostat size is a criterion.

It will be recognized that the invention has been shown and described primarily as having contact points which open at a calibrated temperature above ambient or room temperature. However, and as understood by those skilled in the art, reversing, i. e., turning over the bi-metal strips, will allow the thermostat to be adjusted to cause the contacts to open at a selected temperature below room temperature and/or to close at a selected temperature above room temperature.

While in accord with the patent statutes I have specifically illustrated and described one best-known embodiment of my invention, it is to be particularly understood that I am not to be limited thereto or thereby, but that the scope of my invention is defined in the appended claims.

I claim:

1. A thermostat including a tubular metal casing having substantially an oval shape in cross section, a pair of bi-metal strips, one strip extending into each end of the casing, a rounded contact point on one strip end, and flat contact point on the other strip end, said contact points being adapted to contact each other with the thermostat at a selected temperature, electrical insulation around each strip adjacent the casing ends, the ends of the casing being flattened and compacted around the insulation and strips, the flattening and compacting being concentrated in transversely-extending, opposed stake-like areas, the ends of the strips clamped by the casing being held in parallel relation to each other, the spacing between the parallel relation ends determining the temperature at which the contact points of the strips will operate, and an equal angle between each flattened and compacted end of the casing and the center line of the unflattened portion of the casing.

2. A thermostat including a thermal-conductive casing, a pair of bi-metal strips, one strip extending into each end of the casing, mating contact points on adjacent strip ends, said contact points being adapted to contact each other with the thermostat at a calibrated temperature, insulation around each strip adjacent the casing ends, the ends of the casing being flattened and compacted around the insulation and strips, the ends of the strips clamped by the casing being held in parallel relation to each other, the spacing between the parallel relation ends determining the temperature at which the contact points of the strips will operate, and an equal angle between each flattened and compacted end of the casing and the center line of the unflattened portion of the casing.

3. A thermostat including a tubular casing, a pair of bi-metal strips, one strip extending into each end of the casing, mating contact points on adjacent strip ends, said contact points being adapted to contact each other with the thermostat at a calibrated temperature, insulation around each strip adjacent the casing ends, the ends of the casing being flattened and compacted around the insulation and strips, and a substantially equal angle between each flattened and compacted end of the casing and the center line of the unflattened portion of the casing.

GEORGE FRANKLIN DALES.

REFERENCES CITED

The following references are of record in the file of this patent:

UNITED STATES PATENTS

| Number | Name | Date |
| --- | --- | --- |
| 2,474,190 | Porter | June 21, 1949 |

FOREIGN PATENTS

| Number | Country | Date |
| --- | --- | --- |
| 428,874 | Great Britain | May 21, 1935 |